Sept. 19, 1961 V. S. FOOTE, JR 3,000,627
ASSEMBLY STAND
Filed Aug. 19, 1959 4 Sheets-Sheet 1

INVENTOR
Vernon S. Foote, Jr.

BY
ATTORNEYS

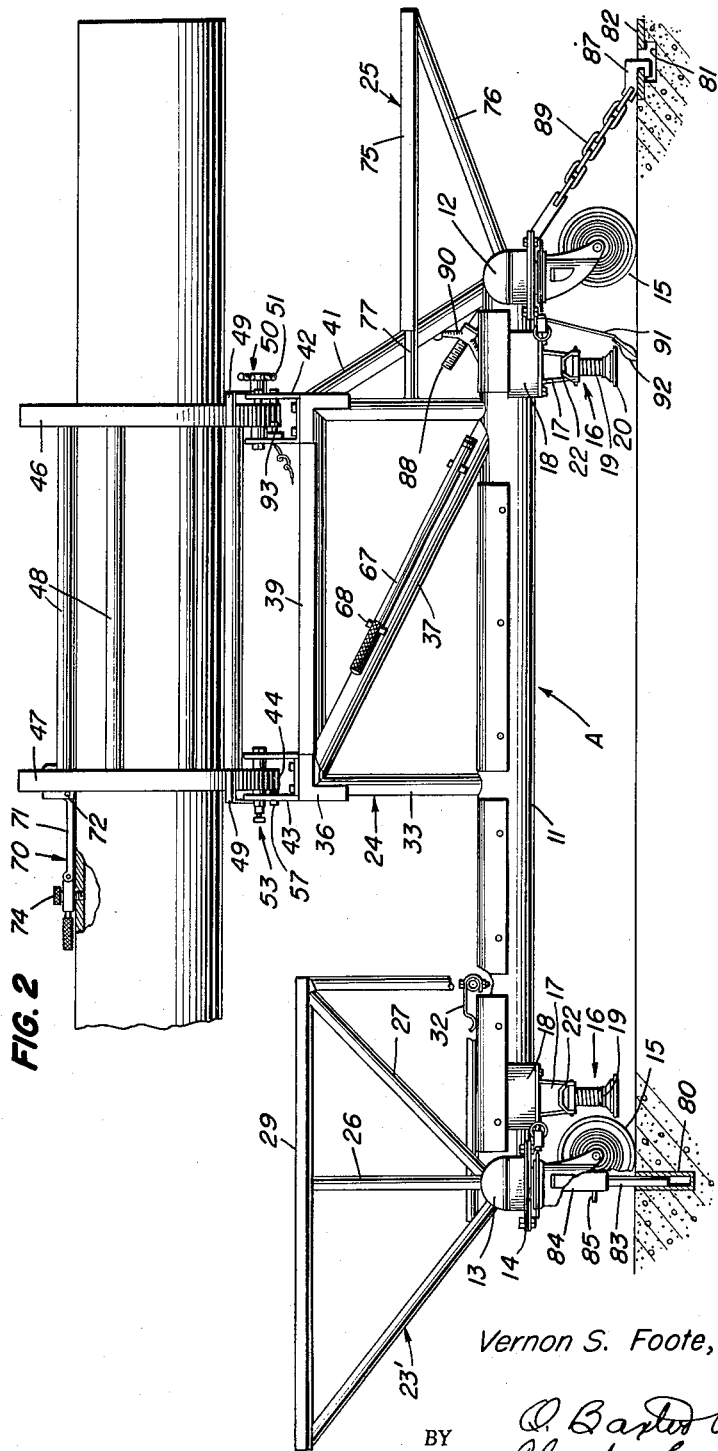

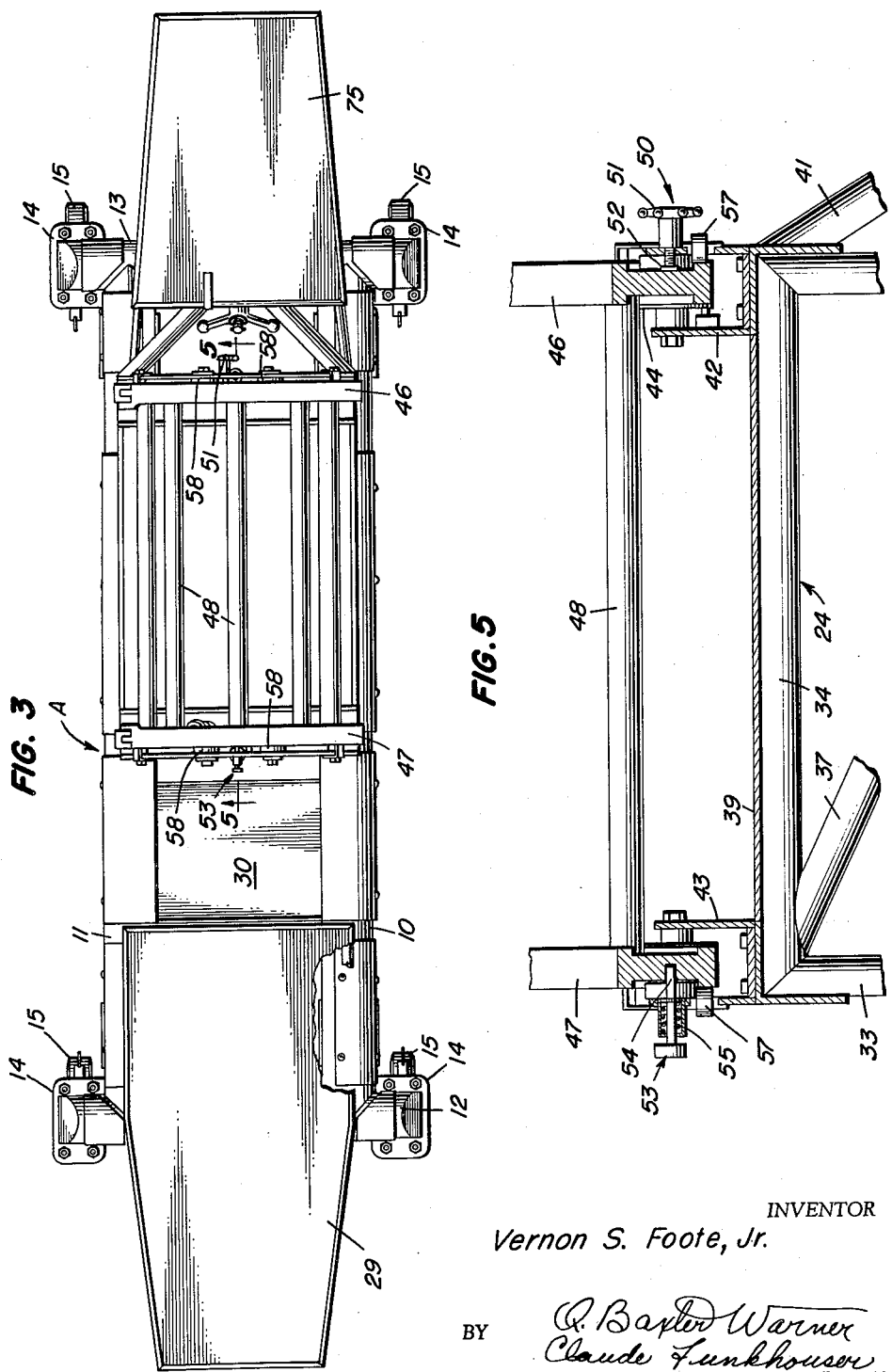

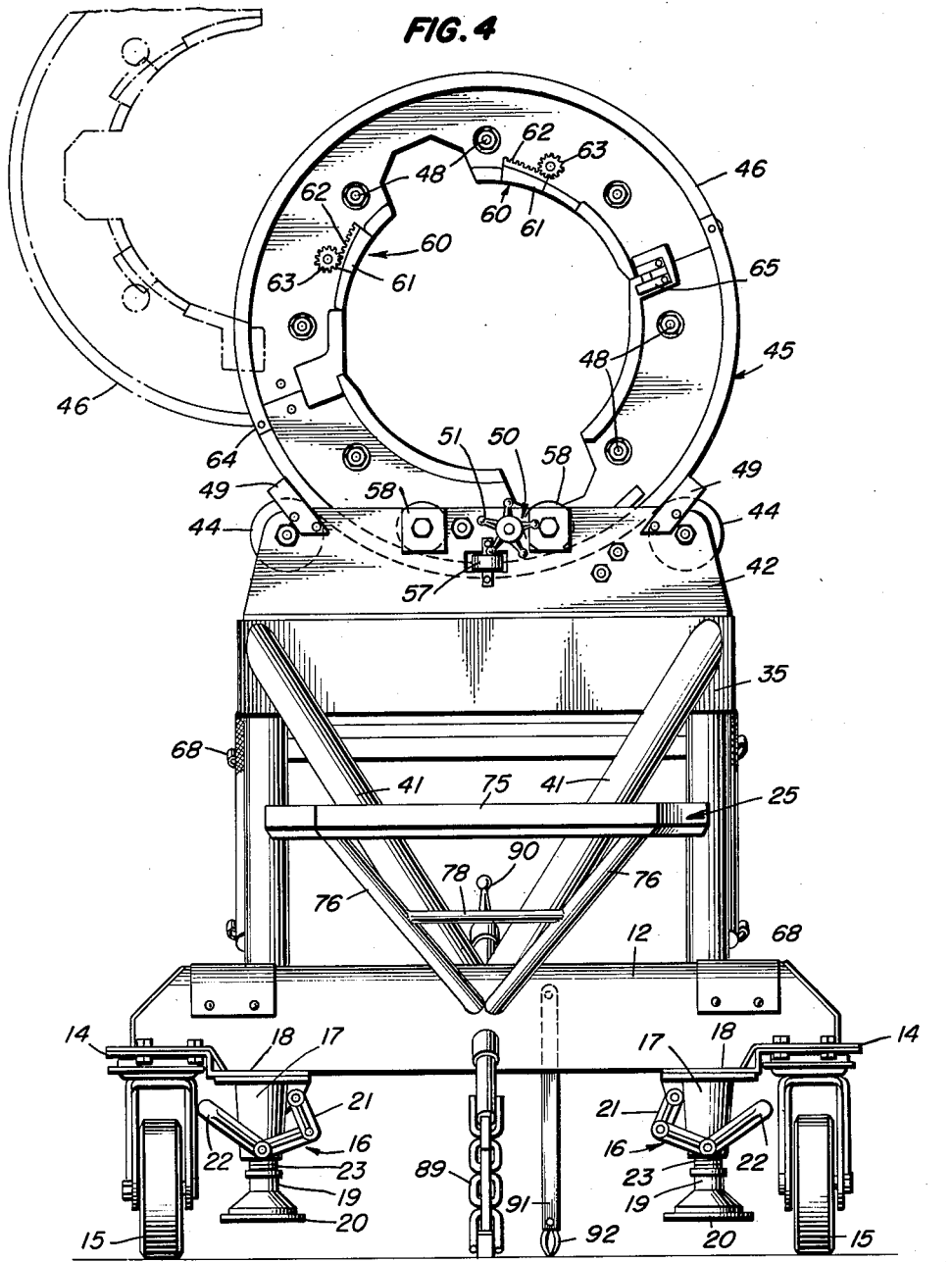

United States Patent Office 3,000,627
Patented Sept. 19, 1961

3,000,627
ASSEMBLY STAND
Vernon S. Foote, Jr., Marblehead, Mass., assignor to the United States of America as represented by the Secretary of the Navy
Filed Aug. 19, 1959, Ser. No. 834,903
10 Claims. (Cl. 269—112)

The present invention relates generally to handling and testing equipment for aerial vehicles such as guided missiles; more particularly it relates to an improved assembly test stand.

One object of the invention is to provide an assembly test stand which may be utilized for supporting the sustainer section of a rocket-propelled missile during connection to the forward and aft ends thereof of other missile sections.

As another object the invention provides a test stand which is so designed that a missile or missile section in position thereon may be moved to and retained in any desired roll attitude.

The invention provides, as a further object, an assembly test stand which may be readily moved from place to place but which is fitted with means for securely locking it to a deck or other supporting surface during missile assembly or test operations.

A still further object of the invention is to provide an assembly test stand that incorporates means for transferring thrust forces from a sustainer rocket in position on the stand, in the event of accidental ignition of the rocket grain, to the supporting surface to which the stand is secured, so that displacement of the sustainer from the stand with consequent injury to personnel and damage to surrounding installations will be largely prevented.

Still another object of the invention is to provide an assembly test stand which is of such rugged construction that it will be capable of supporting a completely assembled aerial missile.

And as another object, the invention provides a stand of the character set forth that employs simple and effective brakes for retaining it in any desired position on a surface during preliminary operations but before securing it to such surface for missile assembly or testing functions in a missile checkout area.

Other objects and many of the attendant advantages of the present invention will be readily appreciated as the same becomes better understood by reference to the following detailed description when considered in connection with the accompanying drawings, wherein:

FIG. 2 is a side elevation showing the stand anchored in operating position ready to receive a missile or missile component thereon;

FIG. 3 is a top plan view of the stand;

FIG. 4 is an aft end view of the device, anchored in operating position as shown in FIG. 2; and FIG. 5 is a detail view, partly in section and partly in elevation, showing particularly the structure for mounting the missile supporting cage employed.

Figure 1:
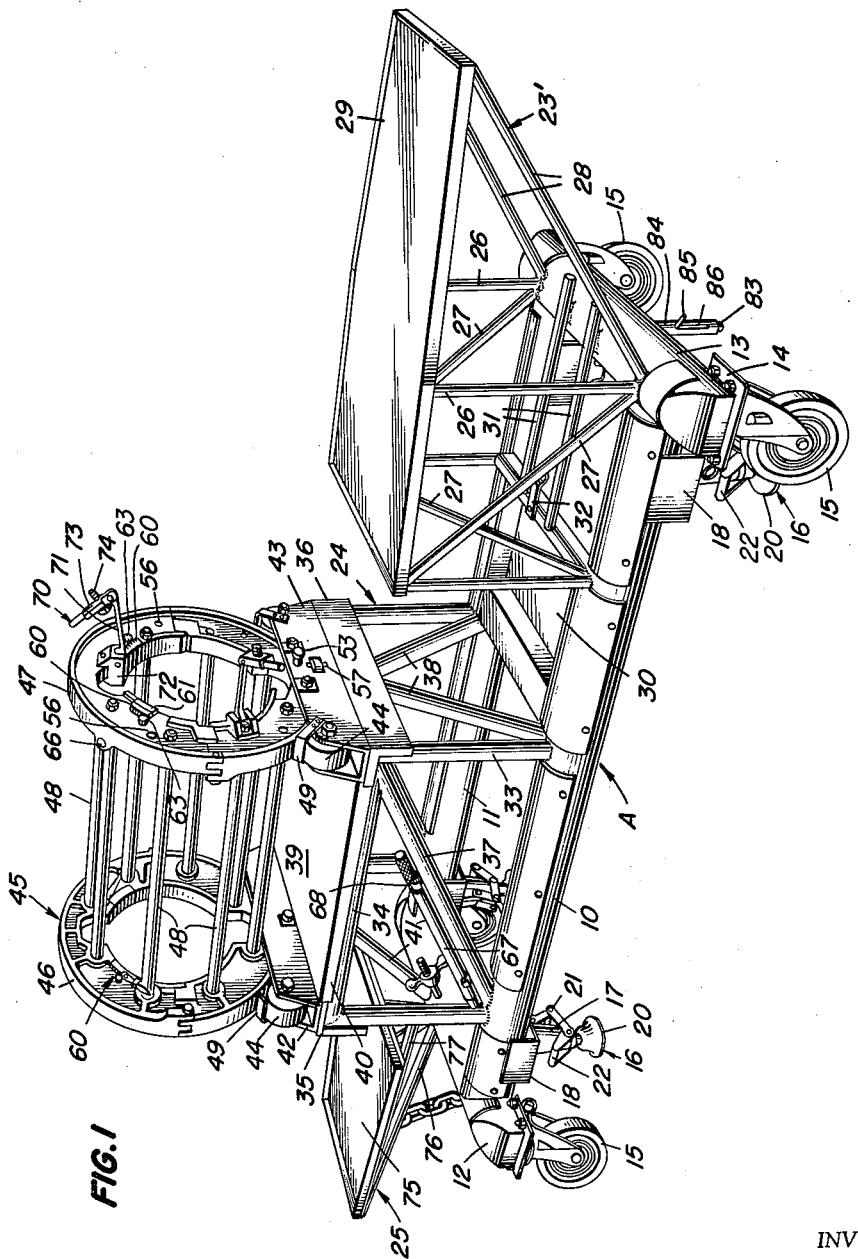
FIG. 1 is a perspective view of the improved assembly test stand.

Basically, the assembly test stand constituting the present invention comprises a generally rectangular frame fabricated of light-weight steel tubing welded into a rigid unit capable of supporting the weight and thrust of a complete rocket-propelled missile. The frame is mounted on four swiveling casters and is equipped with brakes to retain it at any desired location. For securely anchoring the stand in a checkout area, a positioning pin and an anchor hook are employed. The frame rotatably supports a cage for receiving a missile or missile component, and lock and brake mechanisms function to retain the cage in desired positions of roll attitude.

Referring now more specifically to the drawings, the assembly test stand includes a frame A which is of rectangular shape in top plan and includes relatively large diameter tubular side rails 10 and 11 and end rails 12 and 13, the end rails extending outwardly beyond the side rails and having caster mounting plates 14 secured thereto. A caster 15 is mounted to swivel in each of the plates 14, for supporting the frame A at each corner thereof.

For retaining the assembly test stand temporarily in a desired location, four brake mechanisms are employed. These brake mechanisms, indicated generally at 16, are located on the side rails 10 and 11 near the end rails 12 and 13 of the frame. More specifically, as best seen in FIGS. 1 and 4, the brake mechanisms 16 each comprise a housing 17 which is mounted on a base 18 secured to one of the side rails, a plunger 19 movable in the housing, a circular brake shoe 20 on the lower end of the plunger, and a linkage 21 coupling the base 18 and the plunger, the linkage including a foot treadle 22. A spring 23 maintains the plunger under tension in the housing.

The treadles 22 of the brake mechanisms are presented outwardly so that they can be conveniently engaged by a foot of the operator. When depressed, the treadles and associated linkages will shift the plungers downward for engaging the shoes 20 with the surface on which the test stand is resting, for effectively retarding movement of the stand over said surface. It should be understood, however, that the plungers are of such height that they will not cause the shoes to lift the stand to the extent that the casters 15 will clear the supporting surface, even when exerting maximum braking effort. It will thus be seen that the casters will always provide an effective support for the stand.

The assembly test stand includes a forward section 23′, a center section 24 and an aft section 25. The forward section 23′ employs tubular vertical supports 26, which rise from the side rails 10 and 11 and the end rail 13 of the frame A, and diagonally extending truss supports 27 which connect upper and lower ends of adjacent vertical supports. Additional upwardly inclined supports 28 extend forwardly beyond the end rail 13. Secured to the upper ends of the supports 26, 27, and 28 is a relatively shallow sheet metal drip pan 29 which is of generally rectangular shape but has slightly tapered forward side walls. A relatively deep drip pan 30 is mounted between the side rails 10 and 11 between the forward section 23′ and the center section 24, and extending longitudinally of the frame from the forward rim of the pan 30 to the end rail 13 are spaced, tubular guides 31. A clip 32, of resilient metal, is secured to the pan rim and extends forwardly between and slightly above the guides 31. The guides 31 and clip 32 cooperate to retain, for temporary storage, the outer shell or "skin" of a missile component, such as the forward guidance section, during work on the mechanism or circuits of such component.

The center section 24 is of more robust construction than is the forward section 23′. It is of rectangular shape in top plan, is located aft of the drip pan 30, and comprises heavy duty tubular corner posts 33, mounted on the side rails 10 and 11, longitudinally extending top rails 34, and inverted L-shape end plates 35 and 36. Diagonally extending truss supports 37 extend between the upper and lower ends of longitudinally aligned corner posts, and inwardly inclined truss members 38 connect the midportion of the end plate 36 with the side rails 10 and 11 adjacent the innermost corner posts 33. A sheet metal drip pan 39 extends transversely of the top of the section 24 between the end plates 35 and 36, the side portions of said pan resting on the top rails 34 and said side portions having downward flanges 40 for preventing lateral displacement of the pan. To prevent distortion or displacement of the center section due to shocks or other forces exerted longitudinally in an aft direction, braces 41 are employed. As best seen in FIG. 4, the braces 41 converge from the ends of the (aft) end plate 35 toward the center of the end rail 12 of the frame.

Substantially U-shape channel members 42 and 43 extend transversely of the center section and are mounted, respectively, on the end plates 35 and 36. A cage supporting roller 44 is mounted at each end of each of the channel members, four of said rollers being provided. The channel members and rollers constitute a cradle for rotatably mounting a cage 45 which consists mainly of hinged semi-circular end rings 46 and 47 connected by longitudinally extending circumferentially spaced sleeved tie rods 48. A more detailed description of the cage construction will be set forth hereinafter.

Referring again to the channel members 42 and 43, and particularly to FIGS. 1, 2, and 4 of the drawings, it will be seen that both of said members are provided with safety guards 49 that extend above the points of contact between the rollers 44 and the end rings 46 and 47. The guards 49 are of flat sheet metal bent to inverted U-shape, and prevent crushing of fingers between the rollers and the end rings.

The channel member 42 is provided with a friction brake 50 which is located medially of the length of the outside, or aftmost, rail of said member. The brake 50 includes a handwheel 51 and a shoe 52, the shoe being engageable with the aft end surface of the ring 46 of the cage 45 for retaining said cage in any desired roll attitude when the handwheel is advanced. The channel member 43 has mounted on the forwardmost rail thereof, medially of its length, a lock 53 that includes a plunger 54 and a spring 55. The plunger is selectively engageable in one of five circumferentially spaced openings 56 (FIG. 1) formed in the forwardmost face of the ring 47 for locking the cage securely in any one of five selected roll attitudes. As best seen in FIGS. 4 and 5, the channel members 42 and 43 are each provided with a thrust roller 57, engageable with the rings 46 and 47 respectively for limiting axial movement of the cage 45, and a pair of retaining rollers 58 for preventing upward displacement of the cage from the center section 24.

Referring again to the cage 45 for a more complete description of its specific construction, attention is directed to FIGS. 1, 2, and 4. The end rings 46 and 47 are nearly identical, each being comprised of a pair of semi-circular sections hingedly connected in such a manner that, as shown in broken lines in FIG. 4, the cage may be opened to admit a missile or missile component. Each of the end rings is provided with a pair of cam locks for retaining a missile or missile component against rotation with respect to the cage. In FIG. 4 one of these cam locks is shown at 60. It includes an arcuate-faced shoe 61 having inclined rack teeth 62 on its rear edge, engageable by a pinion 63, said pinion being rotatable by a suitable wrench or the like for moving the shoe into or out of engagement with the wall of the missile component. Hinges for connecting the ring sections are shown at 64 and diametrically opposed latches at 65, the latches securely retaining the sections in connected relation.

The rings 46 and 47 are each provided with sockets, one of which is shown at 66 in FIG. 1, for receiving one of each inner end of a pair of levers 67 when it is desired to rock the cage on the center section. When not in use one of each of the levers 67 may be mounted in clips 68 on the truss supports 37 at each side of the center section. The ring 47 is equipped with a pair of thrust straps 70. The straps 70 each include a strap element 71 which is hinged to a block 72 on the end ring 47, and a connector head 73, the head 73 being pivotally connected to the outer end of the element 71 and having a bolt 74 for engagement in a wing root or other opening in the outer wall of the missile component. As shown in FIG. 1, the connector head is slotted to permit limited longitudinal adjustment of the bolt therein. In FIG. 2 one of the straps 70 is shown connected to a missile.

The aft section 25 includes a generally rectangular drip pan 75 which is supported at its four corners by tubular supports 76 which diverge upwardly, outwardly and rearwardly from substantially the midpoint of the end rail 12 of the frame 10, and by horizontal supports 77 which are secured at their inner ends to the aftmost corner posts 33 of the center section 24. As best seen in FIG. 2, the drip pan 75 is located in a horizontal plane substantially midway between the horizontal planes of the drip pans 29 and 39 of the sections 23' and 24, respectively. Referring to FIG. 4 it will be seen that a transverse hook support 78 extends between the two aftmost supports 76.

The assembly test stand constituting the present invention is designed for semi-permanent installation in a missile check-out bay which, as shown in FIG. 2, is provided in the floor thereof with a socket 80 and a recess 81 closed by an apertured plate 82. The recess 81 is spaced from the socket 80, a distance greater than the distance between the fore and aft casters 15. The socket 80 is adapted to receive a retractable pin 83 carried in a housing 84 which extends downwardly from the end rail 13 medially of its length. A finger lift 85 working in a bayonet type slot 86 (FIG. 1) provides a convenient means for raising or lowering the pin 83. The recess 81 receives a hook 87 which engages over the plate 82, said hook being connected to an adjusting screw 88 by a chain 89. A handwheel 90 is carried on the screw 88. As shown clearly in FIGS. 2 and 4, the screw 88 extends diagonally through the end rail 12 medially of its length. From the foregoing description it will be understood that when the pin 83 is engaged in the socket 80 and the hook 87 is engaged in the recess 81, and the screw 88 is tightened, the test stand will be securely anchored in the checkout bay. When the test stand is being moved from place to place the hook may be engaged with the hook support 78 and the pin 83 retracted into the housing 84.

To provide protection from the effects of static electricity a grounding strap 91 is employed, and is connected to the end rail 12 of the frame. The strap 91 is of flexible material and may be looped over the screw 88 during movement of the stand from place to place. As shown in FIGS. 2 and 4, the strap 91 has a metal contactor 92 which engages the surface on which the stand is resting, during missile handling operations.

It is believed that the construction and use of the improved test stand will be clearly understood from the foregoing description. A brief statement pertaining to its operation is believed to be appropriate, however. The test stand is first taken to the assembly area, located under a hoist, and secured against movement by setting the brake mechanisms 16. The cage is then opened, by swinging the ring sections to the positions shown in broken lines in FIG. 4. By the hoist and a suitable lifting tool the missile component is lowered into the cage. The lifting tool is then removed and the cage is closed and locked. The locks 60 are then engaged. Other missile components may then be hoisted into position and connected to the component, and the thrust straps 70 connected to hoist points. The stand is secured in the checkout bay by engaging the pin 83 in the socket 80 and the hook 87 in the recess 81, and tightening the chain 89. The grounding strap 91 is allowed to depend from the frame 10 for engaging the contactor 92 with the surface of the checkout bay. By the use of the levers 67 the missile may be rolled to desired attitudes. A roll potentiometer, such as is shown at 93 in FIG. 2, may be mounted in the channel 42 for engagement with the rim of the ring 46, for transmitting roll position information. The straps 70 function to transmit thrust forces to the floor of the bay.

in the event of accidental ignition of a missile rocket grain. More specifically, rocket thrust would be transmitted to the cage and through the center section to the frame, and from the frame to the deck or floor of the bay through the pin 83, the screw 88, the chain 89, and the hook 87.

The drip pans 29 and 75 extend beyond the ends of a missile in position on the stand. It will thus be seen that said pans will effectively protect said missile ends from damage in the event of collision with other objects during movement of the stand from place to place.

Obviously many modifications are possible in the light of the above teachings. It is therefore to be understood that within the scope of the appended claims the invention may be practiced otherwise than as specifically described.

What is claimed is:

1. An assembly test stand including a frame having a center section, a missile component supporting cage, means rotatably mounting the cage on the center section, locking means including a spring urged plunger on the center section, a plurality of complementary locking means on said cage and cooperating with said plunger for locking the cage in any of a plurality of desired roll positions, braking means including a brake shoe on the center section and movable into engagement with the cage for temporarily securing said cage in a desired roll position, means connected to said brake shoe for moving the shoe into frictional engagement with the cage, displaceable cam means disposed at each end of said cage and movable into engagement with the missile component when the missile component is in said cage for releasably locking the missile component to the cage, and means disposed at each end of the cage in engagement with said cam means for displacing said cam means and casters carried by said frame in engagement with a surface for supporting the stand above the surface.

2. In an assembly test stand, a frame, a center section on the frame, a pair of channel members on the center section, a cage, rollers carried by the channel members in engagement with said cage for rotatably mounting the cage on the center section, thrust rollers on the channel members in engagement with the cage for limiting axial movement of the cage on the center section, spring urged locking means on one of the channel members and engageable with the cage for locking said cage in a selected roll position, brake means on the other channel member and engageable with said cage for temporarily retaining the cage in a desired roll position, missile locking means carried by the cage and movable into engagement with the missile for locking a missile to the cage so that the missile rolls with the cage, and rotatable means on the cage and cooperating with said missile locking means for actuating the locking means.

3. An assembly test stand as recited in claim 2, including means on said cage in engagement with additional rollers on the channel members for limiting upward displacement of the cage from the center section.

4. An assembly test stand as recited in claim 2, including additionally thrust rollers on the channel members in engagement with the cage at each outermost end thereof for preventing longitudinal displacement of the cage on the center section.

5. An assembly test stand as recited in claim 2, wherein said cage includes a pair of end rings rotatably supported by said rollers on the channel members, and said brake means includes a handwheel rotatably mounted on the other channel member and having a shoe connected thereto, the handwheel being rotatable for frictionally engaging the shoe with one of the end rings to retain the cage in a desired roll position.

6. An assembly test stand as recited in claim 2, wherein said cage includes a pair of end rings rotatably supported by said rollers on the channel members, and said spring urged locking means includes a plunger engageable selectively in openings formed in one of the end rings for locking the cage in a selected position.

7. An assembly test stand as recited in claim 2, wherein said missile locking means includes a cam lock movably mounted on the cage at each end thereof and having a shoe provided with rack teeth, and a pinion rotatably mounted at each end of the cage and meshing with said rack teeth for shifting the shoe toward or away from the outer wall of a missile in the cage as the pinion is rotated.

8. An assembly test stand as recited in claim 6, including additionally a pair of thrust devices carried by one of the rings, each of said devices including a strap element pivotally connected to one of the rings for engagement with a missile in the cage, a connector head pivotally connected to the strap element and movable into and out of engagement with a missile in the cage, a bolt carried by the connector head and attached to the missile when the head is in engagement with the missile for restraining the missile against longitudinal movement, and a block carried by said ring for pivotally connecting the strap element to said ring.

9. A mobile missile assembly and test stand comprising a frame adapted to be releasably locked to a surface during a missile assembly and test operation, a pair of missile component supports and a missile component receiving cage rotatably mounted on the frame, a plurality of rollers carried by said frame in engagement with said cage for rotatably mounting the cage on the frame, additional rollers on said frame in engagement with the cage for preventing longitudinal and vertical displacement of the cage, a plurality of mutually spaced openings in the cage at one end thereof, a spring urged plunger carried by the frame and selectively engageable with one of said plurality of openings for locking the cage in a selected position, a handwheel rotatably mounted on the frame, a brake shoe carried by said handwheel and movable into frictional engagement with the cage as the handwheel is rotated for temporarily maintaining the cage in a selected roll position, and caster wheels carried by said frame in engagement with the surface for rendering the stand mobile upon release of the frame from the surface.

10. A mobile missile assembly and test stand adapted to be releasably locked to a surface during a missile assembly and test operation and comprising a frame having a pair of missile component supports and a missile component receiving cage rotatably mounted on the frame, said cage including a separable ring member at each end thereof, roller means carried by said frame in engagement with said ring member at each end of the cage for rotatably mounting the cage within the frame and for preventing longitudinal and vertical movement therein, a plurality of mutually spaced openings in the ring member at one end of the cage, a spring urged plunger carried by the frame and selectively engageable with said openings for locking the cage in a selected position, a handwheel rotatably mounted on the frame, a brake shoe carried by said handwheel and movable into frictional engagement with the ring member at the other end of the cage for temporarily maintaining the cage in a desired roll position, and caster wheels carried by the frame in engagement with the surface for rendering the stand mobile upon release of the stand from the surface.

References Cited in the file of this patent

UNITED STATES PATENTS

| | | |
|---|---|---|
| 1,072,743 | Laufenburg et al. | Sept. 9, 1913 |
| 1,216,552 | Dodge | Feb. 20, 1917 |
| 1,389,068 | Olson | Aug. 30, 1921 |
| 1,834,294 | Spahn | Dec. 1, 1931 |
| 2,468,884 | L'esperance et al. | May 5, 1949 |
| 2,738,501 | Swanson | Mar. 13, 1956 |
| 2,825,477 | Ross | Mar. 4, 1958 |